United States Patent [19]

Fredin

[11] Patent Number: 4,526,746
[45] Date of Patent: Jul. 2, 1985

[54] FUEL ASSEMBLY HAVING WATER PASSAGEWAY IN CHANNEL WALL

[75] Inventor: Bo Fredin, Västerås, Sweden

[73] Assignee: AB Asea-Atom, Västerås, Sweden

[21] Appl. No.: 366,269

[22] Filed: Apr. 7, 1982

[30] Foreign Application Priority Data

May 4, 1981 [SE] Sweden .............................. 8102767

[51] Int. Cl.³ .............................................. G21C 3/30
[52] U.S. Cl. .................................... 376/444; 376/434;
376/908
[58] Field of Search ............... 376/434, 436, 438, 447,
376/439, 443, 444, 440, 441, , 449, 453, 353, 352

[56] References Cited

U.S. PATENT DOCUMENTS

| | | | |
|---|---|---|---|
| 3,132,076 | 5/1964 | West et al. ...................... | 376/447 X |
| 3,205,144 | 9/1965 | Jabsen ............................ | 376/434 X |
| 3,238,108 | 3/1966 | Deddens ........................ | 376/434 X |
| 3,255,091 | 6/1966 | Frisch ............................ | 376/441 |
| 3,317,399 | 5/1967 | Winders ......................... | 376/435 |
| 3,351,533 | 11/1967 | Rohlin ........................... | 376/434 X |
| 3,395,077 | 7/1968 | Long Sun Tong et al. ......... | 376/439 |
| 3,713,974 | 1/1973 | Previti et al. ..................... | 376/439 |
| 3,719,560 | 3/1973 | Mayers ........................... | 376/445 X |
| 3,764,471 | 10/1973 | Ripley ........................... | 376/439 X |
| 3,861,999 | 1/1975 | Zmola et al. ................... | 376/444 X |
| 3,928,126 | 12/1975 | Seim et al. ...................... | 376/440 X |
| 4,089,743 | 5/1978 | Straalsund ..................... | 376/434 X |
| 4,130,460 | 12/1978 | Ilunin et al. .................... | 376/434 X |

FOREIGN PATENT DOCUMENTS

| | | | |
|---|---|---|---|
| 1060507 | 7/1959 | Fed. Rep. of Germany ...... | 376/440 |
| 1482788 | 8/1977 | United Kingdom ............... | 376/434 |

*Primary Examiner*—Richard E. Schafer
*Assistant Examiner*—Daniel Wasil
*Attorney, Agent, or Firm*—Pollock, Vande Sande & Priddy

[57] ABSTRACT

Fuel assembly having square cross-section and a plurality of tube elements (7,8) arranged in a square reactor lattice, at least one of said tube elements being water tubes (8) and a predominant number being fuel rods (7). Each fuel channel wall has a hollow projection (9) lying in a vertical mid-plane. The number of tube elements between two projections (9) lying in the same mid-plane is smaller than nine and greater than two. A plurality of rows of nine tube elements (7, 8) are arranged in parallel with each of the mid-planes.

10 Claims, 7 Drawing Figures

FUEL ASSEMBLY HAVING WATER PASSAGEWAY IN CHANNEL WALL

TECHNICAL FIELD

Nuclear fuel assembly comprising a fuel channel with substantially square cross-section and a plurality of vertical tube elements disposed in said fuel channel, a predominant number of said tube elements being fuel rods, some of said fuel elements being arranged to form at least two first rows and at least two second rows, each of said rows being constituted by nine of said fuel elements arranged one after the other in horizontal direction, said first rows being parallel to a first pair of fuel channel walls, said second rows being parallel to a second pair of fuel channels walls, said tube elements being positioned in said fuel channels in such a way that the vertical middle line in each of said tube elements substantially intersects a corresponding nodal point in an imaginary quadratic lettice.

BACKGROUND ART

A fuel assembly according to the invention is intended to be able to replace known fuel assemblies having approximately the same external cross-sectional dimensions and having sixty-four fuel rods arranged in a square lattice, the fuel rods having the same diameter as, or somewhat smaller diameter than, said known fuel assemblies.

DISCLOSURE OF THE INVENTION

In a fuel assembly according to the invention, the intention is to construct the walls of the fuel channel and arrange the fuel rods in such a way that, in comparison with similar known fuel assemblies, a favourable effect on the neutron flux is obtained while at the same time the fuel economy is considerably improved. This is achieved by using projections and pockets formed in the fuel channel walls as a means of achieving in the reactor core a relatively evenly distributed moderating effect in a horizontal direction, and thus a more even distribution of the neutron flux, which, at unchanged mean enrichment, leads to a considerable increase in the reactivity of the fuel assembly and to a considerable reduction of the difference between the fuel rods of the fuel assembly as regards power load and burnup.

A favourable moderator effect is achieved by providing the projections with at least one through-going, vertical water channel extending along a predominant part of the length of the fuel rods and having, at its lower end, an inlet opening for water passing through. Since the water, which flows through such vertical channels, is subcooled and prevented from making contact with the fuel rods, its void fraction will be zero or extremely small and its moderator effect will be maximal.

In a nuclear fuel assembly according to the invention, the four walls of the fuel channel are each provided with a hollow projection, disposed in the centre of the wall, to form a vertical passageway for moderator water, whereby a row of at least three and less than nine of said tube elements is arranged between the two projections of each pair of parallel fuel channel walls.

BRIEF DESCRIPTION OF THE DRAWINGS

In the following the invention will be described with reference to the accompanying schematic drawings, in which FIGS. 1, 2, 3, 4, 5, 6 each shows one embodiment of a fuel assembly according to the invention in horizontal section through the fuel rods, whereas

DESCRIPTION OF PREFERRED EMBODIMENTS

Figure 1:
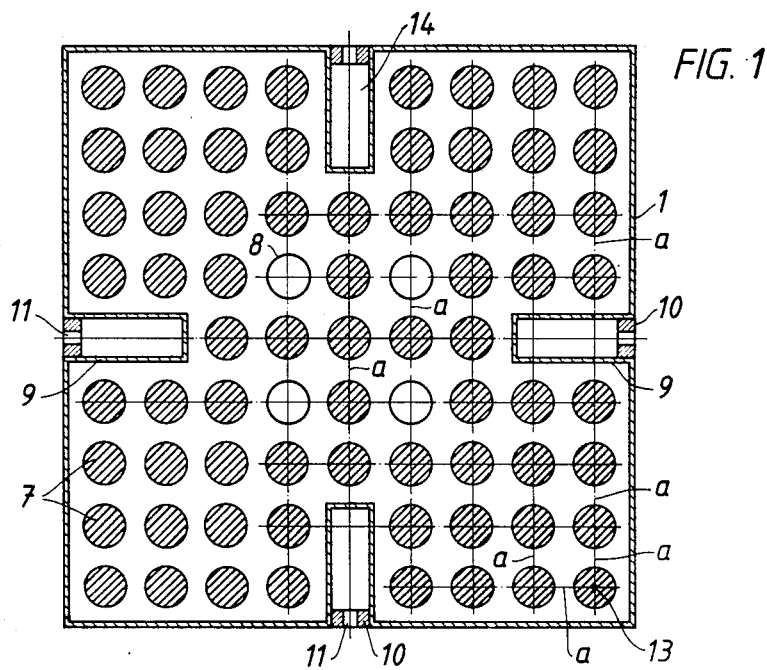

On all the drawings the fuel rods of the fuel assemblies, i.e. the tube elements filled with nuclear fuel, are designated 7. Also, each of the shown fuel assemblies contains at least one vertical water tube 8 which is approximately as long as the fuel rods 7 and intended to be traversed by part of the water flow flowing in at the lower end of the fuel assembly. Said water flow flows in through an assembly base 16, which is hydraulically and mechanically connected to a fuel channel which surrounds a plurality of tubes filled with nuclear fuel and at least one water tube 8. Each water tube has at least one inlet opening 18 and at least one outlet opening 19. The assembly base 16 supports a grid device 17, on which the fuel rods 7 and the water tubes 8 rest with their lower ends. Part of the water flow flowing through the assembly base is distributed into flow paths 14, defined by hollow projections 9.

On FIGS. 1, 2, 3, 4, 5, 6 the fuel channels are designated, respectively, 1, 2, 3, 4, 5, 6. Each of the fuel channels has two pairs of mutually parallel walls, of which the walls in one pair of fuel channel walls make an angle of 90° with the walls in the second pair of fuel channel walls. In each of the fuel channels 1, 2, 3, 4, 5, 6, each of the four walls of the fuel channel is provided with an inwardly-directed, hollow projection 9 which extends along the entire length of the fuel channel and forms a vertical passageway for moderator water. Thus, each pair of mutually parallel fuel channel walls has two hollow projections 9, which are positioned in a vertical plane through the vertical middle line of the fuel channel.

In each of the shown fuel assemblies, the tube elements 7 and 8 surrounded by the fuel channel are arranged with their vertical middle lines through the nodal points 13 in an imaginary reactor lattice, which consists of quadratic squares with the side a, as indicated in FIG. 1. The tube elements of the fuel assembly constitute at least two rows, each of which comprising nine tube elements, which are parallel to one pair of mutually parallel fuel channel wall sides, and at least two rows, each of which is parallel to the second pair of mutually parallel pairs of fuel channel walls. In all the fuel assemblies, the number of tube elements located between two projections 9 and lying in one and the same vertical plane is smaller than nine and greater than two.

Figure 2:
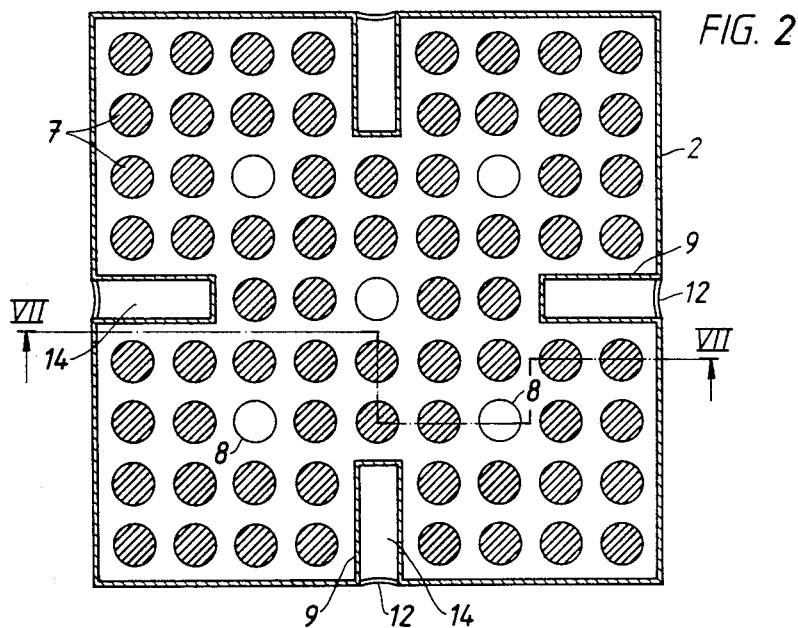
Figure 5:
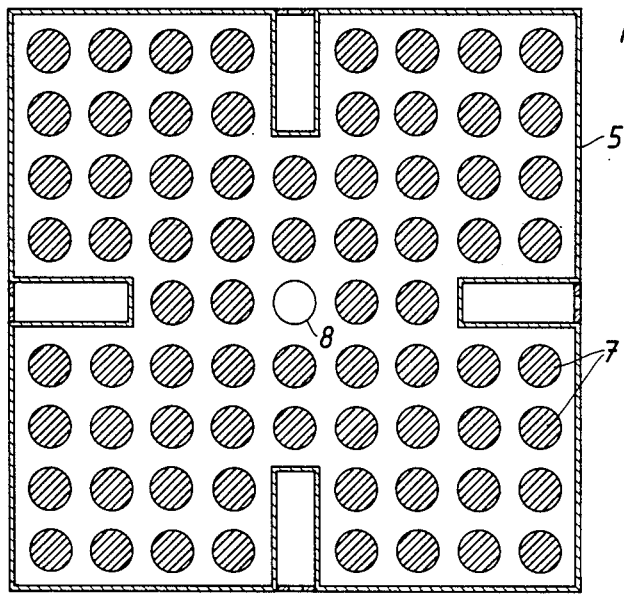

FIGS. 1, 2 and 5 each shows one fuel assembly in which each row of tube elements, located between a pair of hollow projections 9, comprises five tube elements. In the embodiment shown in FIG. 1, each row of tube elements, located between two projections 9, consists of fuel rods 7 only, whereas each such row in FIG. 2 and FIG. 5 consists of four fuel rods 7 and one water tube 8. Each one of the fuel assemblies shown in FIGS. 1, 2 and 5 has eight rows of nine tube elements, and four of these rows are parallel to a first wall pair and four are parallel to the second wall pair. In FIGS. 1 and 2, each group of parallel rows with nine tube elements per row comprises two rows where two of the tube elements consist of water tubes 8. In FIG. 5 there are in all eight rows with nine tube elements, and each of these rows comprises only fuel-filled tubes 7.

Figure 3:
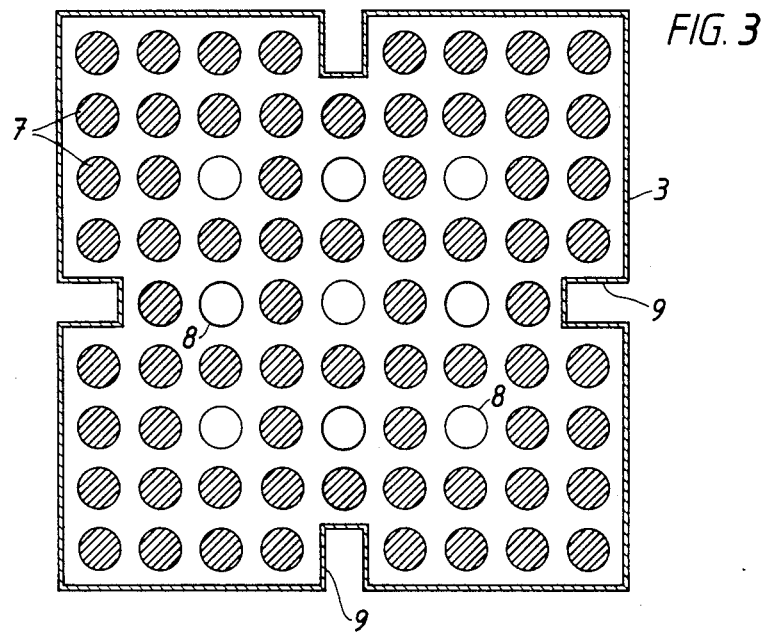
Figure 6:
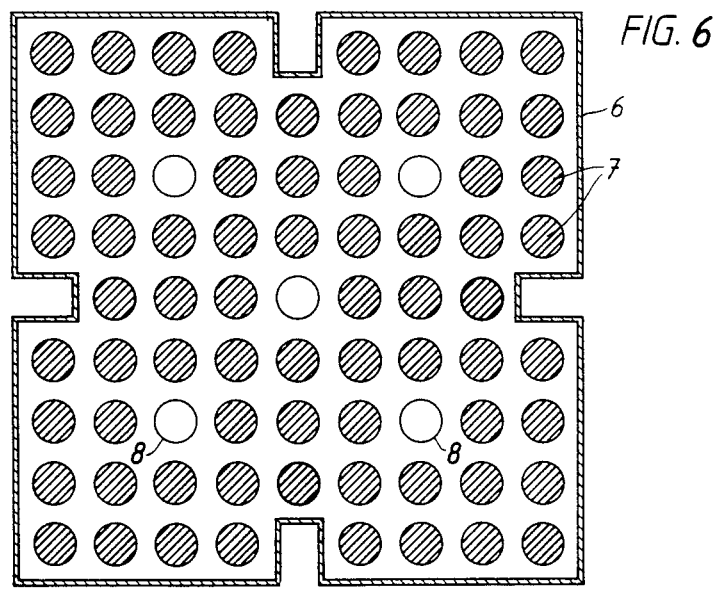
Figure 7:
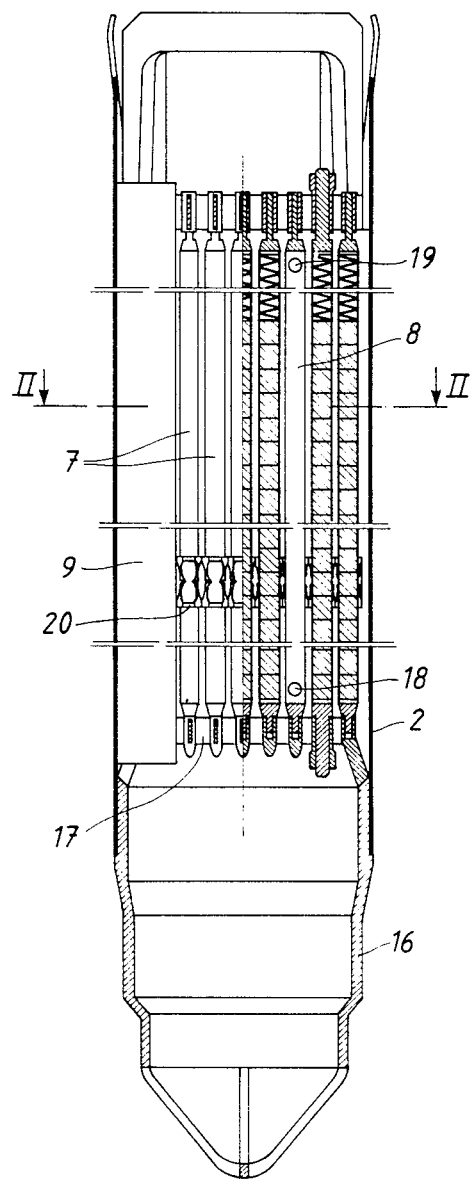
FIG. 7 shows a vertical section along VII—VII in FIG. 2, which shows a section along II—II in FIG. 7.

In FIGS. 3 and 6, each row of tube elements, located between two projections 9, comprises seven tube elements, of which three and one, respectively, are constructed as water tubes. The number of rows made with nine tube elements is six in each direction, whereby four of these six rows only comprise fuel rods 7. Each one of the other two rows comprises, respectively, three and two water tubes 8 and otherwise fuel rods 7.

Figure 4:
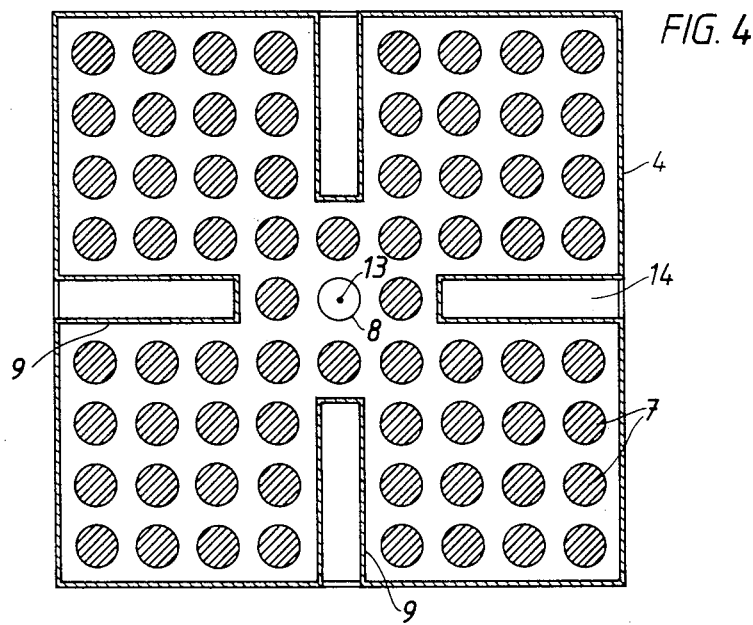

In the fuel assembly shown in FIG. 4 the number of tube elements in each row of tube elements, located between two projections 9, is equal to three, of which one tube element which surrounds the vertical middle line 13 of the fuel assembly is constructed as a water tube. The fuel assembly comprises only two rows of nine tube elements, running parallel to a first pair of fuel channel walls, and only two rows of nine tube elements, running parallel to a second pair of fuel channel walls, said rows only consisting of fuel rods 7.

In all the embodiments of the invention, the hollow projections 9 may be made in the form of pockets extending into the mid-portion of the fuel channel walls and be more or less sealed in an outward direction, for example by means of vertical bars 10, provided with a plurality of through-holes 11, or by means of a plurality of, for example somewhat resilient, connecting elements 12, which are arranged one above the other in spaced relationship.

According to the invention, each projection 9 may be formed as an integral part of a fuel channel wall, or as a particular element which is welded to an adjacent fuel channel element to form some of the fuel channels shown in the drawings.

In each of the fuel assemblies 1, 2, 3, 4, 5, 6 described above, the tube elements 7 and 8 are positioned with the aid of a plurality of spacer devices disposed at different levels, each spacer device consisting of one single spacer, 20, in which the number of spacer cells in equal to the number of tube elements in the fuel assembly. Alternatively, the spacer device may comprise four equal, partial spacers, arranged in one corner each of the fuel channel, with, for example, sixteen spacer cells in each partial spacer, and combined with a centrally arranged spacer. The central spacer is preferably made with greater stiffness than the other spacers and are arranged in such a way as to form a stiff force transmitting member for transmitting horizontal forces between the projections 9 in each pair of mutually parallel fuel channel walls. The mechanical connection between the central spacer and the hollow projections 9 is then preferably made in such a way that the spacer can be removed from the fuel channel only by being subjected to an upwardly-acting force, which can be achieved, for example, by constructing the above-mentioned mechanical connection in the form of a dovetail device.

I claim:

1. A nuclear fuel assembly for a boiling water reactor comprising an assembly base hydraulically connected to a vertical fuel channel with a first pair and a second pair of opposite, mutually parallel channel walls, said first pair being perpendicularly oriented to said second pair, and a plurality of vertical tube elements disposed in said fuel channel, the majority of said tube elements being fuel rods and some of said tube elements being arranged to form at least two first rows and at least two second rows, each of said rows comprising a plurality of said tube elements arranged one after the other in a horizontal direction, said first rows being parallel to said first pair of channel walls and said second rows being parallel to said second pair of channel walls, said tube elements being positioned in said fuel channel in such a way that the vertical middle line of each of said tube elements runs through a corresponding nodal point in an imaginary square lattice, wherein each of said channel walls has an integral, middle wall portion constituting an inwardly directed, hollow projection projecting inwardly beyond all other portions of the wall and at least two of said tube elements, said projection comprising an elongated, vertical internal passageway for providing a flow of moderator water, said vertical passageway constituting more than 50% of the length of said fuel rods, and said middle wall portion keeping the entire flow of moderator water flowing in said passageway separated from said fuel rods and preventing this water from making contact with the fuel rods, and wherein an intermediate row of said tube elements is arranged between the two projections of each pair of said mutually parallel fuel channel walls, said first rows and said second rows having at least four more of said tube elements than said intermediate rows.

2. Fuel assembly according to claim 1, wherein said row of tube elements arranged between two hollow projections comprises at least one water tube the wall of which surrounds the vertical middle line of the fuel channel.

3. Fuel assembly according to claim 2, wherein said tube elements arranged between two projections are five in number.

4. Fuel assembly according to claim 2, wherein said tube elements arranged between two projections are seven in number.

5. Fuel assembly according to claim 4, wherein three of said tube elements arranged between two projections are water tubes whereas the other are fuel rods.

6. Fuel assembly according to claim 1, wherein said tube elements arranged between two projections only consist of fuel rods and the fuel assembly in all comprises four vertical water tubes which are symmetrically arranged in relation to a vertical plane through the vertical middle line of the fuel assembly.

7. Fuel assembly according to claim 1, wherein, in parallel with each of said pair of fuel channel walls, there are arranged four rows of nine tube elements, whereby two of these rows only consist of fuel rods whereas the other two each comprises seven fuel rods and two water tubes.

8. Fuel assembly according to claim 1, wherein, in parallel with each of said pair of fuel channel walls, there are arranged six rows of nine tube elements, whereby four of said six rows only consist of fuel rods whereas each of the other two rows comprises at least two and at the most three water tubes.

9. Fuel assembly according to claim 1, wherein, in parallel with each of said pairs of fuel channel walls, there are arranged only four rows of nine tube elements, each such row only comprising fuel rods.

10. A fuel assembly according to claim 1 in which said first and second rows each contain nine of said tube elements and said intermediate rows each contain at least three and less than nine of said tube elements.

* * * * *